United States Patent
Clark et al.

(10) Patent No.: US 11,680,158 B2
(45) Date of Patent: Jun. 20, 2023

(54) POLYOLEFINS HAVING IMPROVED DIMENSIONAL STABILITY IN THREE-DIMENSIONAL PRINTING, ARTICLES FORMED THEREFROM, AND METHODS THEREOF

(71) Applicant: Braskem S.A., Camaçari (BR)

(72) Inventors: Jason Clark, Pittsburgh, PA (US); Leonardo Ito, Triunfo (BR); Alexandre da Luz, Triunfo (BR)

(73) Assignee: Braskem S.A., Camaçari (BR)

( * ) Notice: Subject to any disclaimer, the term of this patent is extended or adjusted under 35 U.S.C. 154(b) by 396 days.

(21) Appl. No.: 16/763,907

(22) PCT Filed: Nov. 13, 2018

(86) PCT No.: PCT/IB2018/001269
§ 371 (c)(1),
(2) Date: May 13, 2020

(87) PCT Pub. No.: WO2019/092498
PCT Pub. Date: May 16, 2019

(65) Prior Publication Data
US 2020/0332103 A1 Oct. 22, 2020

Related U.S. Application Data

(60) Provisional application No. 62/585,347, filed on Nov. 13, 2017.

(51) Int. Cl.
| | | |
|---|---|---|
| *C08L 23/14* | (2006.01) | |
| *B33Y 10/00* | (2015.01) | |
| *B33Y 70/00* | (2020.01) | |
| *B33Y 80/00* | (2015.01) | |
| *B29C 64/118* | (2017.01) | |
| *B29C 64/141* | (2017.01) | |
| *C08L 23/08* | (2006.01) | |
| *C08L 23/12* | (2006.01) | |
| *B29K 23/00* | (2006.01) | |

(52) U.S. Cl.
CPC .......... *C08L 23/14* (2013.01); *B29C 64/118* (2017.08); *B29C 64/141* (2017.08); *B33Y 10/00* (2014.12); *B33Y 70/00* (2014.12); *B33Y 80/00* (2014.12); *C08L 23/08* (2013.01); *C08L 23/12* (2013.01); *B29K 2023/06* (2013.01); *B29K 2023/08* (2013.01); *B29K 2023/12* (2013.01); *B29K 2023/14* (2013.01); *B29K 2995/0041* (2013.01); *B29K 2995/0045* (2013.01); *C08L 2207/02* (2013.01)

(58) Field of Classification Search
CPC ...... C08L 2207/02; C08L 23/14; C08L 23/12; B33Y 70/00
See application file for complete search history.

(56) References Cited

U.S. PATENT DOCUMENTS

| | | | |
|---|---|---|---|
| 9,039,953 B2 | 5/2015 | Kraibuhler et al. | |
| 2006/0258811 A1 | 11/2006 | Barcus et al. | |
| 2009/0118415 A1* | 5/2009 | Aasetre | C08L 23/10 524/451 |
| 2015/0154885 A1* | 6/2015 | Livermore-Clifford | H01L 41/338 29/25.35 |
| 2015/0251353 A1 | 9/2015 | Rodgers et al. | |
| 2019/0030790 A1 | 1/2019 | Fujita | |
| 2019/0232554 A1* | 8/2019 | De Palo | D01F 6/30 |

FOREIGN PATENT DOCUMENTS

| | | |
|---|---|---|
| CN | 103739954 A | 4/2014 |
| CN | 104086891 A | 10/2014 |
| CN | 105683277 A | 6/2016 |
| CN | 106795346 A | 5/2017 |
| EP | 3115379 A1 | 1/2017 |
| JP | H04-305447 A | 10/1992 |
| JP | 2017-531721 A | 10/2017 |
| WO | 2015/159557 A1 | 10/2015 |
| WO | 2016/066453 A2 | 5/2016 |
| WO | WO-2016066453 A2 * | 5/2016 ............. C08F 10/02 |
| WO | WO-2016087309 A1 * | 6/2016 ............. B29C 45/72 |
| WO | 2017/057424 A1 | 4/2017 |

OTHER PUBLICATIONS

Mileva et al. Polymer 102, 214-220 (Year: 2016).*
Office Action issued in Chinese Application No. 201880083957.3; dated Aug. 1, 2022 with English translation (22 pages).
Office Action issued in corresponding Japanese Application No. 2020-526255, dated Aug. 10, 2021 (6 pages).
International Search Report issued in International Application No. PCT/IB2018/001269, dated Feb. 13, 2019 (4 pages).
Written Opinion issued in International Application No. PCT/IB2018/001269, dated Feb. 13, 2019 (7 pages).

* cited by examiner

*Primary Examiner* — Mark S Kaucher
(74) *Attorney, Agent, or Firm* — Osha Bergman Watanabe & Burton LLP

(57) ABSTRACT

A polymer composition suitable for manufacturing of isotropic three-dimensional printed articles, the composition including: a matrix phase including a propylene-based polymer or copolymer; and a dispersed phase in the matrix phase, the dispersed phase including an ethylene-based copolymer having a C3-C12 comonomer, wherein the dispersed phase has a different composition than the matrix phase, wherein the matrix phase has a crystallization half-time of less than 60 minutes.

13 Claims, No Drawings

POLYOLEFINS HAVING IMPROVED DIMENSIONAL STABILITY IN THREE-DIMENSIONAL PRINTING, ARTICLES FORMED THEREFROM, AND METHODS THEREOF

BACKGROUND

Rapid prototyping or rapid manufacturing processes are manufacturing processes which aim to convert available three-dimensional CAD data directly and rapidly into workpieces, as far as possible without manual intervention or use of molds. In rapid prototyping, construction of the part or assembly is usually done in an additive, layer-by-layer fashion. Those techniques that involve fabricating parts or assemblies in an additive or layer-by-layer fashion are termed "additive manufacturing" (AM), as opposed to traditional manufacturing methods which are mostly reductive in nature. Additive manufacturing is commonly referred to by the general public as "3D printing".

There are currently several basic AM technologies: material extrusion, material jetting, binder jetting, material jetting, vat photopolymerization, sheet lamination, powder bed fusion and directed energy deposition. The most widely used of these AM technologies is based on material extrusion. While some variations exist, this technology generally involves feeding a thermoplastic polymer in the form of a continuous filament into a heated nozzle, where the thermoplastic filament becomes a viscous melt and can be therefore extruded. The 3-dimensional motion of the nozzle or the extruder assembly is precisely controlled by step motors and computer aided manufacturing (CAM) software. The first layer of the object is deposited on a build substrate, whereas additional layers are sequentially deposited and fused (or partially fused) to the previous layer by solidification due to a drop in temperature. The process continues until a 3-dimensional part is fully constructed. The process may also involve a temporary support material that provides support to the part being built and is subsequently removed from the finished part by mechanical means or dissolution in a suitable liquid medium. This process is commonly referred to as fused deposition modeling (FDM) or fused filament fabrication (FFF). There are several thermoplastic polymers that are currently being used in material extrusion based AM processes, such as FDM or FFF. Those materials include acrylonitrile-butadiene-styrene (ABS), poly(lactic acid) (PLA), polycarbonate (PC), polystyrene (PS), high impact polystyrene (HIPS), polycaprolactone (PCL), and polyamide as well as some other polymeric materials. However, the most commonly used materials are ABS and PLA.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure are directed to polymer compositions suitable for manufacturing of isotropic three-dimensional printed articles that include a matrix phase comprising a propylene-based polymer or copolymer; and a dispersed phase in the matrix phase, the dispersed phase comprising an ethylene-based copolymer having a C3-C12 comonomer, wherein the dispersed phase has a different composition than the matrix phase, wherein the matrix phase has a crystallization half-time of less than 60 minutes.

In another aspect, embodiments of the present disclosure are directed to a three-dimensional printed article having unidimensional shrinkage of less than 1.8%, where the article includes a matrix phase comprising a propylene-based polymer or copolymer; and a dispersed phase in the matrix phase, the dispersed phase comprising an ethylene-based copolymer having a C3-C12 comonomer, wherein the dispersed phase has a different composition than the matrix phase.

In yet another aspect, embodiments of the present disclosure are directed to a filament or an extruded pellet that includes a matrix phase comprising a propylene-based polymer or copolymer; and a dispersed phase in the matrix phase, the dispersed phase comprising an ethylene-based copolymer having a C3-C12 comonomer, wherein the dispersed phase has a different composition than the matrix phase.

In yet another aspect, embodiments of the present disclosure are directed to a method for manufacturing an isotropic article by three-dimensional printing where the method includes (1) supplying a filament or extruded pellet to a printing head, (2) ejecting a hot melt of the filament or pellet from the printing head, (3) solidifying the melt to form a printing layer, and repeating (1)-(3) to create a stack of printing layers. The filament or pellet may include a matrix phase comprising a propylene-based polymer or copolymer; and a dispersed phase in the matrix phase, the dispersed phase comprising an ethylene-based copolymer having a C3-C12 comonomer, wherein the dispersed phase has a different composition than the matrix phase.

In yet another aspect, embodiments of the present disclosure are directed to methods for manufacturing a solid article by three-dimensional printing, the method including: (1) supplying a pellet to a printing head, (2) ejecting a hot melt of the pellet from the printing head, (3) solidifying the melt to form a printing layer, and (4) repeating (1) to (3) to stack the printing layers, wherein the pellet includes a heterophasic copolymer composition including: a matrix phase being a propylene-based polymer or copolymer; and a dispersed phase in the matrix phase, the dispersed phase including an ethylene-based copolymer having a C3-C12 comonomer, wherein the dispersed phase has a different composition than the matrix phase.

In yet another aspect, embodiments of the present disclosure are directed to isotropic three-dimensional printed articles including a heterophasic copolymer composition including: a matrix phase being a propylene-based polymer or copolymer; and a dispersed phase in the matrix phase, the dispersed phase including an ethylene-based copolymer having a C3-C12 comonomer, wherein the dispersed phase has a different composition than the matrix phase, wherein the article presents at least one of the following features: a unidimensional shrinkage of less than 1.8%; or an isotropic shrinkage ratio in the range of 0.8 to 1.2.

Other aspects and advantages of the claimed subject matter will be apparent from the following description and the appended claims.

DETAILED DESCRIPTION

Embodiments of the present disclosure are directed to polymer compositions, granules or filaments thereof, articles manufactured therefrom, and methods of use thereof. In particular, embodiments disclosed herein relate to polymer compositions used in additive manufacturing, and the associated filaments or granules thereof, the articles printed therefrom, and methods of use thereof.

Conventional polymers used in additive manufacturing include, for example, PLA and ABS. Polyolefins, on the other hand, are generally not used in additive manufacturing because the articles, as each successive layer is deposited and cools, exhibit shrinkage, warpage, and/or curling (at the edges and corners), for example. However, embodiments of the present disclosure are directed to polyolefin compositions that exhibit reduced physical distortion during additive manufacturing than conventional polyolefins.

In one or more embodiments, the polymer composition suitable for use in additive manufacturing may be a heterophasic copolymer having a polyolefin matrix phase and a discrete phase of an ethylene-propylene copolymer. These two-phase materials may also be referred to as impact copolymers or ICPs.

The polyolefin matrix phase may have high crystallization kinetics that allow for rapid crystallization of the matrix that is combined with an amorphous discrete phase that exhibits low unidimensional shrinkage (equivalently referred to as unidirectional shrinkage or unidirectional change). Such combination may allow for an overall polymer composition that avoids the physical distortion typical for polyolefins used in additive manufacturing processes/systems.

For example, conventional polyolefin compositions may exhibit a unidimensional shrinkage of 1.8% or more (determined as the ratio of the difference between the as-printed and final (cooled) length to the as-printed length). In contrast, one or more embodiments of the present disclosure may have a unidimensional shrinkage of less than 1.8%, or even less than 1.6% or 1.4% in embodiments.

Further, one or more embodiment of the present disclosure may exhibit low warpage. Warpage is related to unidimensional shrinkage, but involves considers shrinkage in the three dimensions of an article, not just a single direction. Thus, an article may exhibit shrinkage, but so long as the shrinkage is isotropic or substantially isotropic (having the same or substantially same shrinkage in each dimension), the article may have low warpage. Isotropic shrinkage (and thus warpage) may be expressed as a ratio of the shrinkage in the machine direction (as the article is produced) to the shrinkage in the transverse direction (transverse to the machine). One or more embodiments of the present disclosure may have an isotropic shrinkage ratio that is greater than or equal to 0.8 and less than or equal to 1.2. Further, in more particular embodiments, the lower limit may be any of 0.8, 0.82, 0.84, 0.86, 0.88, 0.9, 0.92, 0.94, 0.96, 0.98 or 1.0 and the upper limit may be any of 1.2, 1.18, 1.16, 1.14, 1.12, 1.1, 1.08, 1.06, 1.04, 1.02, or 1.0 where any lower limit may be used in combination with any upper limit.

Applicants believe the low shrinkage/warpage may result from rapid crystallization kinetics for the matrix phase of a heterophasic copolymer. In one or more embodiments, polymer composition may have a matrix phase having a crystallization half-life ($t_{c1/2}$), measured at 30° C. undercooling (30° C. under the melting temperature) on an isothermal DSC, is less than 60 minutes. One or more embodiments may have a crystallization half-life of less than 50 minutes, less than 40 minutes, or less than 30 minutes.

Matrix Polymer

In one or more embodiments, polymer compositions may be ICPs that include at least two major component phases, including a matrix polymer that forms a substantial proportion of the final ICP polymer composition. Matrix polymers in accordance with the present disclosure include polymers and copolymers derived from propylene monomers and one or more comonomers including ethylene and alpha-olefins such as 1-butene, 1-pentene, 1-hexene, 1-heptene, 1-octene, 1-nonene, 1-decene, 1-undecene, 1-dodecene, and the like, such as in a random copolymer. Comonomers may form less than 50 wt % of the copolymer (i.e., propylene forms greater than 50 wt % of the units of a copolymer). In one or more embodiments, a matrix polymer may include a combination of one or more polymers or copolymers that may be blended pre- or post-polymerization in a reactor.

In one or more embodiments, the matrix polymer may have a mole percent (mol %) of propylene that ranges from a lower limit selected from 50, 55, 60, or 80 mol %, to an upper limit selected from 85, 90, 95, or 100 mol %, where any lower limit may be combined with any upper limit, and where the balance of the mol % of the matrix polymer may be contributed from one or more comonomers. Thus, the ICP matrix polymer may be propylene. "Polypropylene" shall mean polymers comprising greater than 50% by weight of units which have been derived from propylene monomer. This includes polypropylene homopolymers or copolymers (meaning units derived from two or more comonomers).

Matrix polymers in accordance with the present disclosure may contain a mole percent (mol %) of comonomer that ranges from a lower limit selected from any of 0, 0.5, 1, and 1.5 mol %, to an upper limit selected from any of 2.5, 5, 7.5, and 10 mol %, where any lower limit may be paired with any upper limit. However, more or less comonomer may be added depending on the particular application for the polymer. For example, stiffness may be improved by decreasing the amount of comonomers such as α-olefins, while impact resistance and melt strength may be improved with increasing comonomer content. In some embodiments, the matrix is a propylene/alpha olefin random copolymer optionally comprising from 0.01 wt. % to 5 wt. %, for example, less than about 2.0 wt. %, of ethylene.

The matrix polymer may be included at a percent by weight (wt %) of the final polymer composition that ranges from a lower limit selected from any of 50, 60, and 70 wt %, to an upper limit selected from any of 75, 85, and 95 wt %, where any lower limit may be paired with any upper limit.

As mentioned above, the matrix phase may be semi-crystalline, such as having a crystallinity (measured using DCS crystallinity on xylene insoluble content) that ranges from 60 to 80 weight percent of the matrix phase. However, given that the matrix phase is part of an impact copolymer with a dispersed phase, the overall crystallinity of the polymer, measured as the DSC crystallinity, may range from 25 to 80 wt %. Further, in one or more embodiments, the lower limit may range from any of 25, 30, 35 or 40 wt %, with an upper limit ranging from 60, 65, 70, 75, or 80 wt percent, where any lower limit can be used in combination with any upper limit.

"Melt index" or "melt flow rate" (units of g/10 min or dg/min.) is described according to and measured per ASTM D1238 using a load of 2.16 kg at 230° C. In some embodiments, the matrix phase has a melt index of from about 0.3 g/10 min. to about 200 g/10 min. The bulk polymer has a melt index of from about 0.25 g/10 min. to about 150 g10/min. Melt index and other measurements that are distinct for the matrix and discrete phases may be determined by separating the two phases from each other with xylene solubilization (where the discrete phase is soluble in xylene and the matrix phase is not).

Internal Phase

Polymer compositions in accordance with the present disclosure may include an internal rubber phase that increases the impact resistance and modifies other physical properties such as melt flow rate (MFR), melt strength (MS), and the like. Further, the internal or dispersed phase may be amorphous, which serves in contrast to the semi-crystalline matrix phase. Thus, in an additive manufacturing process, upon depositing a "layer" of polymer material, the matrix phase begins to crystallize (quickly), and the internal layer exhibits low shrinkage.

The dispersed copolymer phase comprises from 5 to 50 weight % of the total polymer composition, e.g., an ICP. In general, the dispersed copolymer phase may comprise at least 5, 10, 15, 20, or 25% by weight of the ICP, and in general, no more than 50, 40, 35, 30, 25 or 20% by weight of the ICP. In specific embodiments, the dispersed copolymer phase may comprise from about 10 to 50 percent by weight or even from about 10 to 40 percent by weight of the ICP. The dispersed copolymer phase of the present compositions may comprise one or more individual polymers (whether in-reactor or post reactor blends). The dispersed copolymer phase may take any shape including, for example, spherical, elongate, or otherwise non-spherical shape.

In one or more embodiments, rubbers suitable for use as a rubber internal phase include copolymers having ethylene and one or more monomers, such as a C3-C12 comonomer. In some embodiments, the internal rubber phase of an ICP composition may be an ethylene-propylene rubber (EPR), which may in include EPRs having one or more comonomers in addition to ethylene and propylene. Other comonomers may include, for example, α-olefins such as 1-butene, 1-pentene, 1-hexene, 1-heptene, 1-octene, 1-nonene, 1-decene, 1-undecene, 1-dodecene, and the like. In one or more embodiments, the ethylene may be present as a comonomer in the ICP an amount that ranges from 30 to 55 weight percent.

Polymer compositions in accordance with the present disclosure may include a rubber internal phase containing multiple rubber polymers. According to the present invention, the dispersed copolymer phase comprises a blend of at least two copolymers, namely a first copolymer of ethylene and a $C_3$-$C_{12}$ alpha-olefin and a second copolymer of ethylene and a $C_3$-$C_{12}$ alpha-olefin. According to the present invention, the dispersed copolymer phase comprises from 40 to 90 percent by weight of a first copolymer, in other embodiments from 50 to 80 percent by weight of a first copolymer, or even from about 60 to 70 percent by weight of a first copolymer; and the dispersed copolymer phase comprises from 10 to 60 percent by weight of a second copolymer, in other embodiments from 20 to 50 percent by weight of the second copolymer, or even from about 30 to 40 percent by weight of the second copolymer. According to one or more embodiments, the weight percent of ethylene in the second copolymer may be greater than the weight percent of ethylene in the first copolymer. It is within the scope of the present disclosure for the dispersed copolymer phase to further comprise a third, fourth or even fifth copolymer of ethylene and an alpha-olefin.

In some embodiments, the intrinsic viscosity (IV) of the internal phase may be modified to tune the MS and MFR of the final polymer composition, for example, to modify polymer performance. In one or more embodiments, the IV for the internal rubber phase may be in the range of 1.5 to 7.5 dl/g. Further, in one or more embodiments, such IV of the rubber phase may be higher than the IV of the matrix phase, i.e., it may have a viscosity ratio of greater than 1.

Synthesis

In some embodiments, the polymer composition comprising the matrix phase and the dispersed phase is made through an in-reactor process. The monomers are feed into a reactor for polymerization, and a resulting polymer composition having the two-phase structure described herein is obtained. In some other embodiments, the polymer composition comprising the matrix phase and the dispersed phase is made through a post-reactor process by blending a first polymer ingredient and a second polymer ingredient. The first polymer ingredient mainly contributes to the matrix phase while the second polymer ingredient mainly contributes to the dispersed phase. In one or more embodiments, the ICP may be made using Ziegler-Natta catalyst in an in-reactor solution.

For example, the propylene impact copolymer can be made using one or more matrix phase polymerization steps, occurring in one or more gas phase reactors; one or more dispersed phase polymerization steps, occurring in one or more liquid phase reactors; and at least one de-gassing step. In some embodiments, the propylene ICP is made in an in-reactor comprising monomer including propylene and a comonomer such as ethylene. In the one or more matrix phase polymerization steps, alpha-olefin may be used as a comonomer. Examples of a suitable alpha-olefin include but are not limited to butene, pentene, hexene and heptene. The polymerization is catalyzed with Ziegler-Natta catalyst.

Catalysts employed in the polymerization of α-olefins may be characterized as supported catalysts or unsupported catalysts, sometimes referred to as homogeneous catalysts. The so-called conventional Ziegler-Natta catalysts are stereospecific complexes formed from a transition metal halide and a metal alkyl or hydride, such as titanium tetrachloride supported on an active magnesium dichloride. A supported catalyst component includes, but is not necessarily limited to, titanium tetrachloride supported on an "active" anhydrous magnesium dihalide, such as magnesium dichloride or magnesium dibromide. A supported catalyst component may be employed in conjunction with a co-catalyst such as an alkylaluminum compound, for example, triethylaluminum (TEAL). The Ziegler-Natta catalysts may also incorporate an electron donor compound that may take the form of various amines, phosphenes, esters, aldehydes, and alcohols.

Some of the compositions of the present invention are prepared in a sequential polymerization process wherein a propylene based polymer (defined as the ICP "matrix") is prepared first, followed by the preparation of a copolymer rubber. The composition described herein can be prepared using a Ziegler-Natta catalyst, a co-catalyst such as triethylaluminum ("TEA"), and optionally an electron donor including the non-limiting examples of dicyclopentyldimethoxysilane ("DPCMS"), cyclohexylmethyldimethoxysilane ("CMDMS"), diisopropyldimethoxysilane ("DIPDMS"), di-t-butyldimethoxysilane, cyclohexylisopropyldimethoxysilane, n-butylmethyldimethoxysilane, tetraethoxysilane, 3,3,3-trifluoropropylmethyldimethoxysilane, mono and di-alkylaminotrialkoxysilanes or other electron donors known in the art or combinations thereof. Examples of different generation Ziegler-Natta catalysts that can be applied to the practice of the present disclosure are described in the "Polypropylene Handbook" by Nello Pasquini, 2nd Edition, 2005, Chapter 2 and include, but are not limited to, phthalate-based, di-ether based, succinate-based catalysts or combinations thereof. The catalyst system may be introduced at the beginning of the polymerization of propylene and is transferred with the resulting propylene based polymer to the copolymerization reactor where it serves to catalyze the gas phase copolymerization of propylene and ethylene (or a higher alpha-olefin) to produce the rubber phase.

Compositions can also be blends of the ethylene-propylene rubber (EPR) elastomer (or other ethylene-alpha olefin copolymer) with polypropylene homopolymer and random copolymer. These compositions can be made by blending or otherwise dispersing particles of EPR elastomer into a matrix of the propylene-based polymer. The propylene-based polymer and the EPR elastomer may be combined by way of dry blending and/or melt blending.

As is generally known in the art, hydrogen may be added to any of the reactors to control molecular weight, intrinsic viscosity and melt flow rate (MFR) of the polymeric composition within the reactor. In certain embodiments, the composition of the dispersed rubber phase may be controlled (typically in the second reactor) by the ratio of the alpha-olefin comonomers and the amount of hydrogen. According to certain embodiments, the overall melt flow rate of the ICP polymer composition may be greater than or equal to 0.25 g/10 min. In other embodiments, the overall melt flow rate of the ICP polymer composition may be between 0.25 g/10 min and 150 g/10 min, and in other embodiments between 2 g/10 min and 75 g/10 min.

In one or more embodiments, an ICP composition may be further combined with other additives such as anti-oxidants, acid scavengers, nucleating agents, and the like. In some embodiments, the additives may be added prior to combination of the matrix polymer with the internal rubber phase.

ICP compositions may be formulated in some embodiments as an extruded filament or granule (or pellet) which may be used in an additive manufacturing process. Filament may have a diameter, for example, of 1.0 to 4.0 mm. Pellets may have a similar diameter.

Additives

As mentioned, a number of additives may be incorporated into ICP compositions in accordance with the present disclosure that may include for example, stabilizers, antioxidants (for example hindered phenols such as Irganox™ 1010 from the BASF Corporation), phosphites (for example Irgafos™ 168 from the BASF Corporation), cling additives (for example polyisobutylene), polymeric processing aids (such as Dynamar™5911 from 3M Corporation or Silquest™ PA-1 from Momentive Performance Materials), fillers, colorants, clarifiers (for example, Millad 3988i and Millad NX8000 from Milliken & Co.); antiblock agents, acid scavengers, waxes, antimicrobials, UV stabilizers, nucleating agents (for example talc, sodium benzoate, Sodium 2,2'-methylene bis-(4,6-di-tert-butyl phenyl)phosphate, 2,2'-Methylenebis-(2,6-ditert-butylphenyl)phosphate (lithium salt), Aluminum hydroxybis[2,4,8,10-tetrakis(1,1-dimethylethyl)-6-hydroxy-12-H-dibenzo[d,g][1,3,2]dioxaphosphocin 6-oxidato], dibenzilidene sorbitol, nonitol 1,2,3-trideoxy-4,6:5,7-bis-O-[(4-propylphenyl)methylene], Cis-endo-bicyclo[2.2.1]heptane-2,3-dicarboxylic acid (disodium salt), 1R,2S-cyclohexanedicarboxylic acid (calcium salt), zinc stearate, pigments that act as nucleators, aromatic carboxylic acids, calcium carbonate, pimelic acid, calcium hydroxide, stearic acid, organic phosphates, and mixtures thereof), optical brighteners, long term heat agents, slip agents, pigments, processing aids, antistatic agents, polyethylene, impact modifiers, compatabilizers, as well as any combinations of the aforementioned additives. Such additives may be added to the extruder to prepare the compositions having specific properties. The extruded polymer may subsequently be used in three-dimensional printing.

Nucleating agents are commonly used in polypropylene. Such agents change crystallization temperature, spherulitic size, density, clarity, impact and tensile properties of polypropylene. Similarly, nucleating agents are also used in polyethylene, particularly in linear low density polyethylene (LLDPE) to improve optical, impact, and other physical properties. However, the use of nucleating agent in high density polyethylene (HDPE) is less common because HDPE readily crystallizes without nucleating agent. In general, nucleating agents do not significantly improve the barrier properties of HDPE films. The nucleating agent may be a one metal salt from a saturated bicyclic dicarboxylate, hexahydrophthalic acid, dibenzylidene sorbitol and dibenzylidene sorbitol derivatives, or sodium benzoate. The nucleating agent for this invention is one that is capable of changing the orientation of crystalline lamellae and/or modifies the crystal size of the polyolefin. In embodiments, the nucleating agent can range from 0.01% to 5% by weight, with about 0.03% to 3%) by weight preferred, and about 0.03% to 2% by weight particularly preferred.

In one or more embodiments, polymer compositions may include one or more fillers. Fillers in accordance with the present embodiments may include carbon black, silicic acid powder, precipitated calcium carbonate, calcium carbonate, talc, titanium dioxide and clay. In one or more embodiments, one or more fillers may be included at a concentration of the ICP composition that ranges from a lower limit selected from any of 20, 30, 40, and 50 ppm, to an upper limit selected from any of 50, 100, 150, and 200 ppm, where any lower limit may be paired with any upper limit.

Applications

Additive manufacturing systems are used to print or otherwise build 3D parts from digital representations of the 3D parts (e.g., AMF and STL format files) using one or more additive manufacturing techniques. Generally, examples of commercially available additive manufacturing techniques include extrusion-based techniques such as fused deposition modeling (FDM), electro-photography (EP), jetting, selective laser sintering (SLS), high speed sintering (HSS), powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer. Particular additive manufacturing techniques that may be particularly suitable for the present polymer compositions include, for example, fused deposition modeling, selective laser sintering, material jetting, or plastic freeforming.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

For example, according to fused deposition modeling, a filament or granules formed from the polymer composition discussed above are heated and extruded through an extrusion head that deposits the molten plastic in X and Y coordinates, while the build table lowers the object layer by layer in the Z direction.

Selective laser sintering uses powdered material in the build area instead of liquid or molten resin. A laser is used to selectively sinter a layer of granules, which binds the material together to create a solid structure. When the object is fully formed, it's left to cool in the machine before being removed.

Plastic freeforming, such as that offered by ARBURG GmbH and Co KG (Lossburg, Germany), operates using standard granulated plastics that are melted such as in an injection molding process. A clocked nozzle that opens and closes (up to 100 times a second) builds the component layer-by-layer from miniscule plastic droplets. Further description about such technique may be found in U.S. Pat. No. 9,039,953, which is herein incorporated by reference in its entirety.

Thus, in one or more embodiments, the polymer composition has a peak melting point (as measured by differential scanning calorimetry) of greater than 150° C.

Further, it is also understood that while an article of the present disclosure may be formed using an "additive manufacturing system", such "additive manufacturing system" refers to a system that prints, builds, or otherwise produces 3D parts and/or support structures at least in part using an additive manufacturing technique. The additive manufacturing system may be a stand-alone unit, a sub-unit of a larger system or production line, and/or may include other non-additive manufacturing features, such as subtractive-manufacturing features, pick-and-place features, two-dimensional printing features, and the like.

Further, the use of the present polymer compositions, rather than conventional polymers used in additive manufacturing, may provide greater flexibility in the products produced by the additive manufacturing methods. Specifically, for example, the articles produced by additive manufacturing may have a lower flexural modulus and excellent fatigue resistance as compared to PLA or ABS, for example, which may allow the articles to be formed into living hinge articles or articles incorporating a living hinge therein. A living hinge is a flexure bearing or hinge that is made from the same material to the two (rigid) bodies it connects, but based on its thinner geometry, it allows for bending at the hinge.

Other articles that may be formed, include, for example, packaging, rigid and flexible containers, household appliances, molded articles such as caps, bottles, cups, pouches, labels, pipes, tanks, drums, water tanks, medical devices, shelving units, and the like. Specifically, any article conventionally made from the polymer compositions of the present disclosure (using conventional manufacturing techniques) may instead be manufactured from additive manufacturing.

Testing Methodology

Intrinsic Viscosity

The intrinsic viscosity is measured according to ASTM D 445 (Standard Test Method for Kinematic Viscosity of Transparent and Opaque Liquids) in decalin at 135° C.

Crystalization half-time and thermal behavior via Differential Scanning Calorimetry (DSC)

The melting points of the polymers (Tm) are measured by Differential Scanning Calorimetry (D.S.C.) on a TA Instruments DSC-1 calorimeter, previously calibrated against indium melting points, and according to ASTM E 968, ASTM E 793, ASTM E 794 e ASTM D3418 at 10° C./min. The weight of the samples in every DSC crucible is kept at 6.0+1 mg.

In order to obtain the melting point, the weighted sample is sealed into aluminium pans and heated to 200° C. at 10° C./minute. The sample is kept at 200° C. for 5 minutes to allow a complete melting of all the crystallites, then cooled to −20° C. at 10° C./minute. The peak temperature (Tc) is taken as the crystallization temperature. After standing 5 minutes at −20° C., the sample is heated for the second run time to 200° C. at 10° C./min. In this second heating run, the peak temperature (Tm) and the crystallinity are taken from the melt temperature. The theoretical value for polypropylene, which is 190 J/g, is used to calculate the crystallinity. To calculate the half-life of crystallization, the Tc result is used.

Ethylene content via Fourier Transform Infrared Spectroscopy (FTIR)

Comonomer content is measured with Fourier transform infrared spectroscopy (FTIR) calibrated with 13C-NMR. When measuring the ethylene content in polypropylene, a thin film of the sample (thickness about 300 mm) is prepared by hot-pressing. The area of —CH2-absorption peak 775-670 $cm^{-1}$ (0.2 to 3% ethylene) or 758-702 $cm^{-1}$ (3 to 33% ethylene) is measured with Thermo Scientific Nicolet FTIR iS50 spectrometer, and sample thickness is corrected by the area between 4482-3950 $cm^{-1}$.

Example

Several polypropylene samples were tested for their shrinkage following printing by plastic freeforming. PP1 is a homopolymer having a melt flow rate of 7 g/10 min; PP2 is a random copolymer having a melt flow rate of 10 g/10 min; and PP3 is a heterophasic copolymer having a melt flow rate of 8 g/10 min. The results are shown in Table 1 below. The shrinkage measured is a unidirectional shrinkage on a 3D printed part.

TABLE 1

Results for Example 1

| Sample | Type | MFR (230° C./2.16 kg) (g/10 min) | Ethylene Content in Rubber Phase (% wt) | Crystallinity (%) | Tc (° C.) | Tm (° C.) | Unidimensional Shrinkage (%) |
|---|---|---|---|---|---|---|---|
| PP1 | HOMO | 7 | 0 | 58 | 125 | 162 | 1.8 |
| PP2 | RACO | 10 | 0 | 49 | 120 | 151 | 1.8 |
| PP3 | HECO | 9 | 12.5 | 44 | 129 | 165 | 1.2 |

Although the preceding description is described herein with reference to particular means, materials and embodiments, it is not intended to be limited to the particulars disclosed herein; rather, it extends to all functionally equivalent structures, methods and uses, such as are within the scope of the appended claims.

What is claimed:

1. A polymer composition suitable for manufacturing of isotropic three-dimensional printed articles, the composition comprising:
   a matrix phase comprising a propylene-based polymer or copolymer; and
   a dispersed phase in the matrix phase, the dispersed phase comprising an ethylene-based copolymer having a C3-C12 comonomer, wherein the dispersed phase has a different composition than the matrix phase,
   wherein the matrix phase has a crystallization half-time of less than 60 minutes measured at 30° C. less than a melting temperature of the matrix phase, and
   wherein the polymer composition has a unidimensional shrinkage of less than 1.8% and an isotropic shrinkage ratio in the range of 0.8 to 1.2 after 3D printing.

2. The polymer composition of claim 1, wherein the dispersed phase is present in an amount ranging from 10 to 50 wt % of the total polymer composition.

3. The polymer composition of claim 1, having a viscosity ratio of the intrinsic viscosity of the dispersed phase to the intrinsic viscosity of the matrix phase of greater than 1.

4. The polymer composition of claim 1, wherein the matrix phase has a crystallinity ranging from 60 to 80 wt %.

5. A three-dimensional printed article comprising the composition of claim 1, having a unidimensional shrinkage of less than 1.8%.

6. The three-dimensional printed article of claim 5, comprising a living hinge.

7. The three-dimensional printed article of claim 6, wherein the dispersed phase forms elongated domains within the matrix phase.

8. A filament for a three-dimensional printer comprising the composition according to claim 1.

9. The filament of claim 8, wherein the polymer composition has a peak melting point of greater than 150° C., as measured by differential scanning calorimetry (DSC).

10. The filament according to claim 8, wherein the filament has a diameter of 1.0 to 4.0 mm.

11. A method for manufacturing a solid article by three-dimensional printing, the method comprising:
    (1) supplying the filament according to claim 8 to a printing head;
    (2) ejecting a hot melt of the filament from the printing head;
    (3) solidifying the melt to form a printing layer; and
    (4) repeating (1) to (3) to create a stack of printing layers.

12. An extruded pellet for a three-dimensional printer comprising the composition according to claim 1.

13. A method for manufacturing a solid article by three-dimensional printing, the method comprising:
    (1) supplying the pellet of claim 12 to a printing head;
    (2) ejecting a hot melt of the pellet from the printing head;
    (3) solidifying the melt to form a printing layer; and
    (4) repeating (1) to (3) to create a stack of printing layers.

* * * * *